United States Patent
Bruck et al.

(10) Patent No.: US 10,091,921 B2
(45) Date of Patent: Oct. 9, 2018

(54) ELECTRIC ROW CLEANER ACTUATION ASSEMBLY

(71) Applicant: STEERING SOLUTIONS IP HOLDING CORPORATION, Saginaw, MI (US)

(72) Inventors: Daniel S. Bruck, Essexville, MI (US); Matt R. Burk, Bay City, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 19 days.

(21) Appl. No.: 15/221,680

(22) Filed: Jul. 28, 2016

(65) Prior Publication Data

US 2017/0027097 A1 Feb. 2, 2017

Related U.S. Application Data

(60) Provisional application No. 62/197,775, filed on Jul. 28, 2015.

(51) Int. Cl.

| | |
|---|---|
| *A01B 63/30* | (2006.01) |
| *A01C 7/08* | (2006.01) |
| *A01B 39/04* | (2006.01) |
| *A01B 49/06* | (2006.01) |
| *A01B 63/28* | (2006.01) |
| *A01B 63/00* | (2006.01) |
| *A01C 7/00* | (2006.01) |
| *A01C 7/20* | (2006.01) |

(52) U.S. Cl.
CPC .............. *A01B 39/04* (2013.01); *A01B 49/06* (2013.01); *A01B 63/008* (2013.01); *A01B 63/28* (2013.01); *A01B 63/30* (2013.01); *A01C 7/006* (2013.01); *A01C 7/08* (2013.01); *A01C 7/205* (2013.01); *A01C 7/208* (2013.01); *Y02P 60/23* (2015.11)

(58) Field of Classification Search
CPC ......... A01B 39/04; A01B 49/04; A01B 63/28; A01B 46/06; A01B 63/30; A01B 63/008; A01C 7/08; A01C 7/006; A01C 7/205; A01C 7/208
USPC .......................................... 172/668
See application file for complete search history.

(56) References Cited

U.S. PATENT DOCUMENTS

| | | | | |
|---|---|---|---|---|
| 5,129,282 A | * | 7/1992 | Bassett ................. | A01B 63/26 111/139 |
| 5,588,382 A | * | 12/1996 | Embree ................. | A01B 35/16 111/139 |
| 8,408,149 B2 | * | 4/2013 | Rylander ............... | A01B 63/32 111/140 |

(Continued)

*Primary Examiner* — John Weiss
(74) *Attorney, Agent, or Firm* — Cantor Colburn LLP

(57) ABSTRACT

An electric row cleaner actuation assembly is provided. The electric row cleaner actuation assembly includes a row cleaner unit engageable with a soil to clear a planting area for a seed planting device to dispense seeds. The electric row cleaner actuation assembly also includes a motor. The actuation assembly further includes a telescoping tube arrangement comprising an inner tube and an outer tube, the outer tube moveable along the inner tube and operatively coupled to the row cleaner unit. The actuation assembly yet further includes a position driving element engageable with the outer tube to displace the outer tube to adjust a downforce applied to the row cleaner unit.

10 Claims, 4 Drawing Sheets

(56) References Cited

U.S. PATENT DOCUMENTS

| | | | | |
|---|---|---|---|---|
| 8,813,662 B2* | 8/2014 | Martin | ............... | A01C 5/06 |
| | | | | 111/135 |
| 9,137,939 B2* | 9/2015 | Winick | ............... | A01L 363/008 |
| 2011/0247843 A1* | 10/2011 | Whalen | ............... | A01B 63/008 |
| | | | | 172/315 |
| 2013/0104785 A1* | 5/2013 | Achen | ............... | A01C 5/062 |
| | | | | 111/157 |
| 2015/0025752 A1* | 1/2015 | Tolstedt | ............... | A01C 21/005 |
| | | | | 701/50 |
| 2016/0338260 A1* | 11/2016 | Hahn | ............... | A01C 5/068 |

* cited by examiner

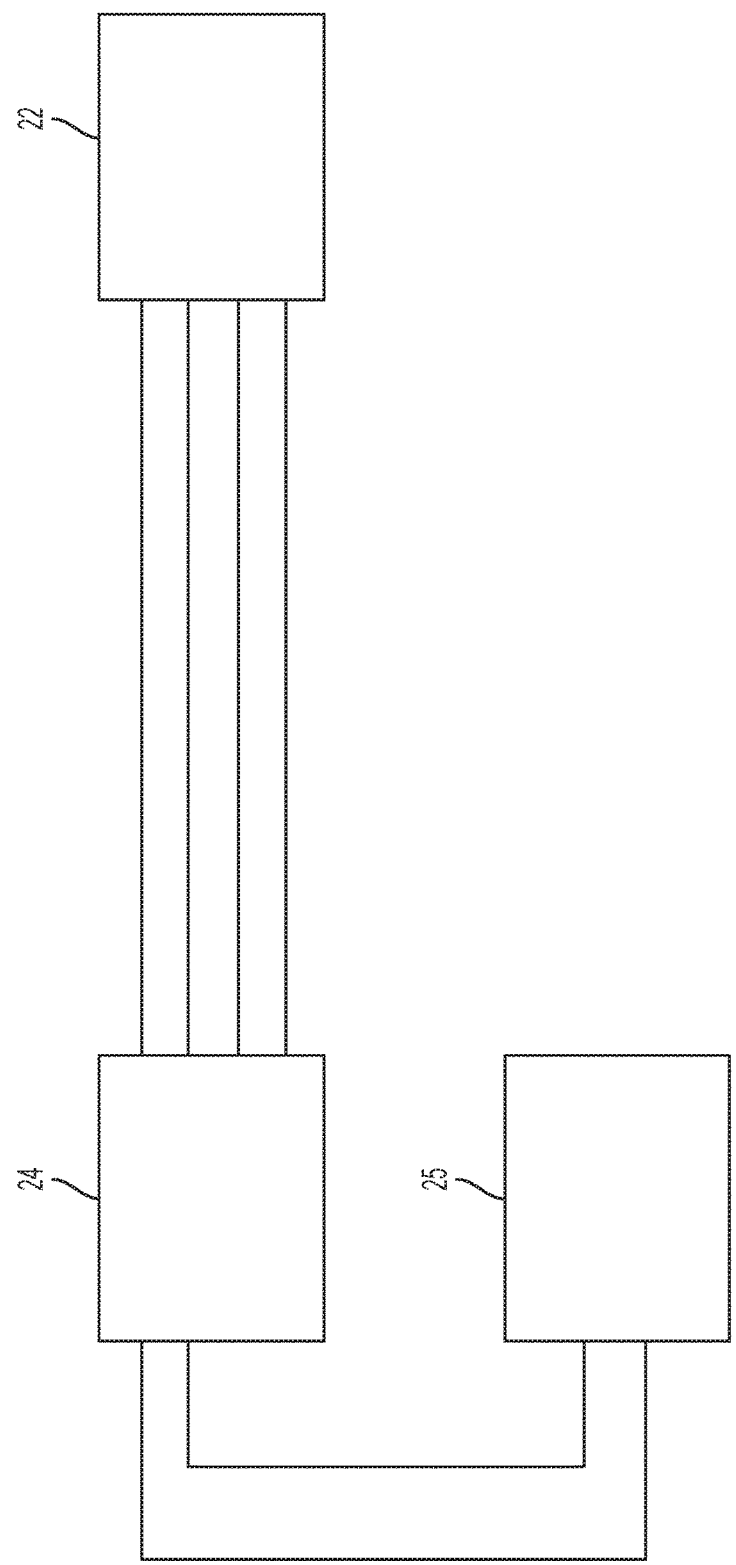

ELECTRIC ROW CLEANER ACTUATION ASSEMBLY

CROSS-REFERENCE TO RELATED APPLICATION

This patent application claims priority to U.S. Provisional Patent Application Ser. No. 62/197,775, filed Jul. 28, 2015, which is incorporated herein by reference in its entirety.

BACKGROUND OF THE INVENTION

The embodiments described herein relate to agricultural seed planters and, more particularly, to an electric row cleaner actuation assembly to be employed with seed planters.

Planting implements currently used in farming operations, commonly referred to as "planters," utilize a seed channel opener, typically in the form of a disc, which creates a channel or furrow in the soil for seed placement. The planters include at least one, but typically a plurality of row units that plant the seeds. In some cases, it may be desirable to clear the terrain, at least to some extent, over which the planter travels. Assemblies that may be referred to as "row cleaners" may be utilized to clean the terrain and are accordingly attached to the planter at a position in advance of the disc that plants the seed. By placing the row cleaners in front of the discs, relative to motion of the planter, the terrain is cleaned and seeds are subsequently planted in the cleaned area. "Cleaning" rows refers to any clearing of a terrain that is beneficial for planting operations. This may include pushing aside dirt, rocks, and crop residue, for example.

Row cleaners are lifted off of the ground when cleaning is not desired. Conversely, when cleaning is desired a down pressure is applied to the row cleaner to clear obstacles away from the planter. Lifting and down pressure operations are typically carried out with a pneumatic or hydraulic powered assembly. Hydraulic units are expensive and require running multiple hydraulic lines. Pneumatic systems require two air lines to be run to each actuator that moves the row cleaner. In addition to the unique disadvantages noted above, both systems are prone to leaks.

SUMMARY OF THE INVENTION

According to one aspect of the disclosure, an electric row cleaner actuation assembly is provided. The electric row cleaner actuation assembly includes a row cleaner unit engageable with a soil to clear a planting area for a seed planting device to dispense seeds. The electric row cleaner actuation assembly also includes a motor. The actuation assembly further includes a telescoping tube arrangement comprising an inner tube and an outer tube, the outer tube moveable along the inner tube and operatively coupled to the row cleaner unit. The actuation assembly yet further includes a position driving element engageable with the outer tube to displace the outer tube to adjust a downforce applied to the row cleaner unit.

According to another aspect of the disclosure, an electric row cleaner actuation assembly includes a row cleaner unit engageable with a soil to clear a planting area to dispense seeds. Also included is an electric motor controlled by a motor controller. Further included is a downforce adjustment mechanism driven by the electric motor and coupled to the row cleaner unit to adjust a downforce thereof. Yet further included is a downforce controller in operative communication with the motor controller, the downforce controller receiving commands from a user and communicating a desired downforce to be applied by the row cleaner unit.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 6 is a schematic illustration of a wired arrangement of the electric row cleaner actuation assembly.

DETAILED DESCRIPTION

Referring now to the Figures, where the invention will be described with reference to specific embodiments, without limiting same, an electric row cleaner actuation assembly is provided to accurately and precisely control row cleaner units in agricultural applications in a reliable manner.

Figure 1:
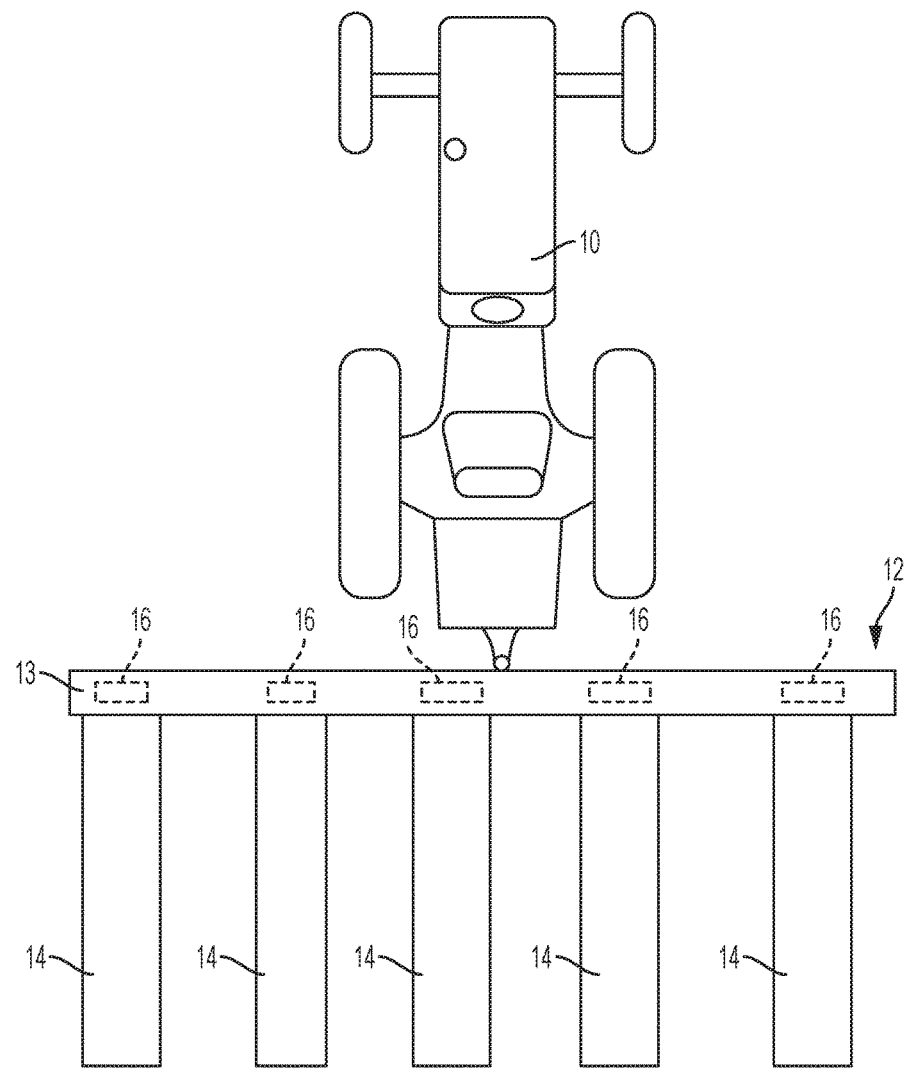
FIG. 1 is a partial view of seed planter towed by a tractor.

Referring to FIG. 1, schematically illustrated is a tractor 10 with a seed planting device, or planter 12, hitched thereto. Although not illustrated in detail, the planter 12 comprises a fixed main frame 13 having tires attached thereto for movement along the ground. The planter 12 includes a disc assembly that is used to cut a channel for a seed to be placed. As shown, the planter 12 includes a plurality of row units 14 that are spaced from each other in a lateral direction. Each of the row units 14 translates over the ground and plants seeds at spaced intervals along the direction of travel of the respective row unit.

To provide a desirable terrain for seed planting, at least one, but typically a plurality of row cleaner units 16 are located proximate the ground and forwardly of the discs of each row unit 14. Each row cleaner unit 16 is used to displace objects that are to be moved out of the location in which the seeds will be planted. In the illustrated embodiment, the row cleaner units 16 are located directly under the main frame 13, but it is to be appreciated that the row cleaner units may be located at any location forwardly of the discs that establish the seed planting location. For example, the row cleaner units 16 may be located forward or rearward of the main frame 13.

Figure 2:
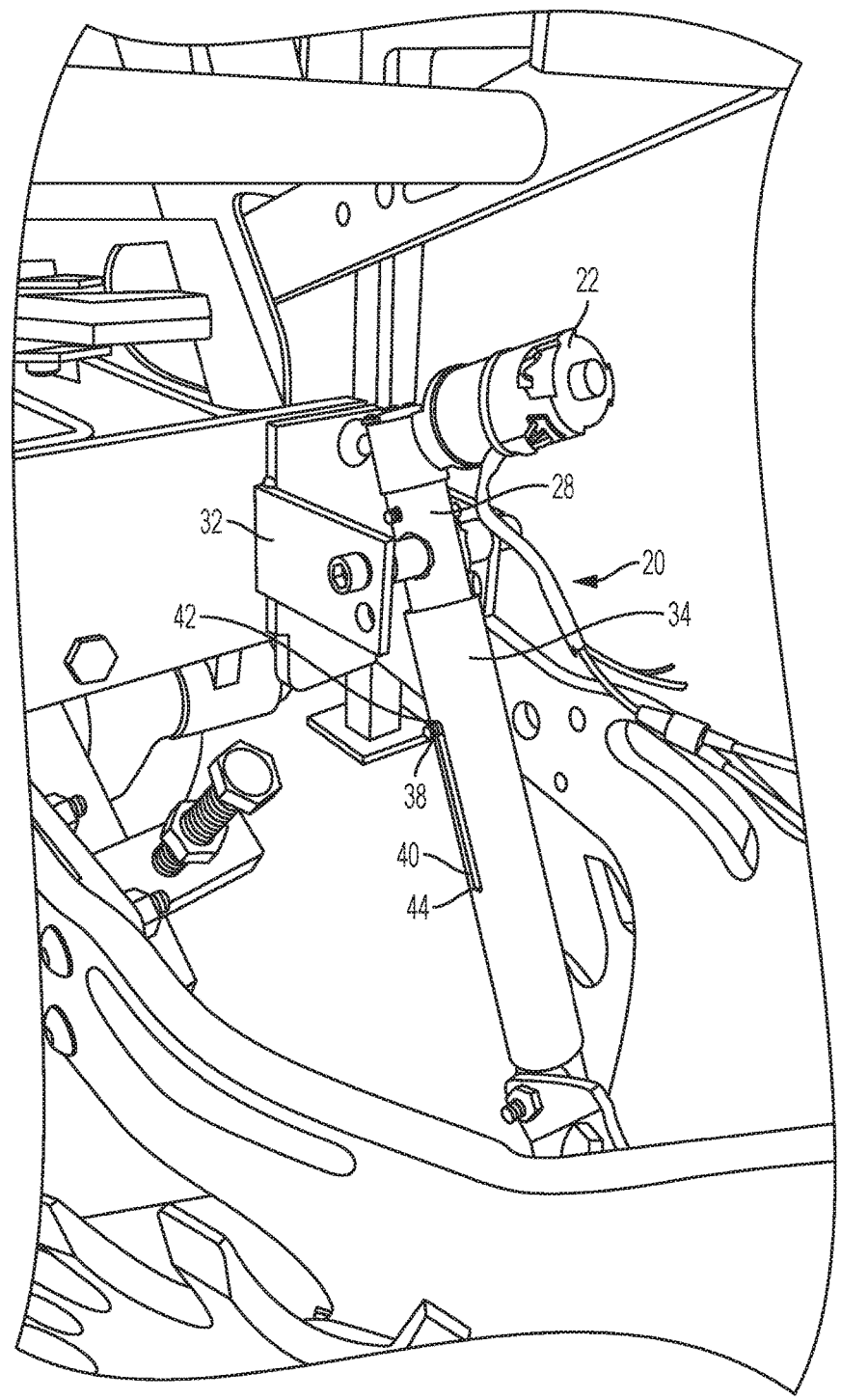
FIG. 2 is a perspective view of an electric row cleaner actuation assembly.
Figure 5:
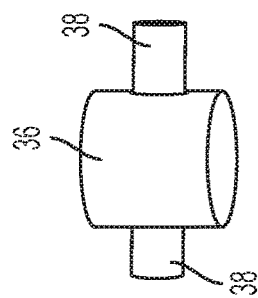
FIG. 5 is a nut of the electric row cleaner actuation assembly.
Figure 4:
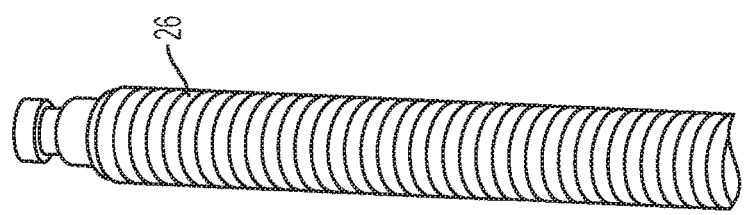
FIG. 4 is a threaded rod of the electric row cleaner actuation assembly.

Referring to FIG. 2, an electric row cleaner actuation assembly 20 is illustrated. The actuation assembly 20 is employed to control the downforce applied to the row cleaner unit 16. The desirable downforce will vary depending upon the type of terrain over which the row cleaner unit 16 is traversing. For example, soil types that have a lower density (i.e., looser) do not require as great of a load as soil types that are more dense (i.e., harder). Therefore, an operator selects a downforce to be applied to the row cleaner unit 16 by the actuation assembly 20 based on the type of soil that is being seeded.

Figure 3:
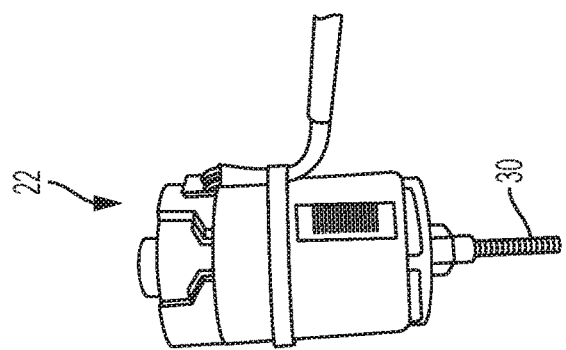
FIG. 3 is a motor of the electric row cleaner actuation assembly.

To overcome disadvantages associated with pneumatic and hydraulic actuation assemblies, the embodiments described herein provide an electrically operated assembly. The actuation assembly includes a motor 22 (FIG. 3) that is in communication with a motor controller 24, which is in communication with a downforce controller 25 that receives input from commands made by an operator, as shown in the wiring schematic of FIG. 6. In some embodiments, the downforce controller 25 is located in the cab of the tractor 10 and receives commands from a touch screen that the operator interacts with. Although illustrated in FIGS. 2 and 6 as a hard wired connection, it is contemplated that some aspects of the control communications are performed wirelessly.

Referring now to FIGS. 2-5, the motor 22 is operatively coupled to a threaded rod 26 (FIG. 4) that is disposed within an inner tube 28. The threaded rod 26 extends in a longitudinal direction that substantially corresponds to a longitudinal direction of the inner tube 28. The motor 22 includes an output shaft 30 (FIG. 3) that is coupled to a gearbox (not shown), which is coupled to the threaded rod 26 in a manner that rotates the threaded rod 26 in a desired direction. The inner tube 28 is stationary and coupled to the planter 12, such as with a bracket 32. The inner tube 28 is at least partially surrounded by an outer tube 34, with the outer tube 34 being moveable along the inner tube 28 in a telescoping manner.

A nut 36 (FIG. 5) is in threaded engagement with the threaded rod 26 and includes at least one anti-rotation pin 38 extending therefrom. The at least one anti-rotation pin 38 protrudes through slots 40 defined by the outer tube 34. The inner tube 28 may include slots as well or alternative openings that allow the anti-rotation pin 38 to extend through the slots 40 of the outer tube 34. In the illustrated embodiment, the nut 36 includes two anti-rotation pins that extend through slots on opposing sides of the outer tube 34.

As the nut 36 translates upwardly along the threaded rod 26, it will eventually engage an upper end 42 of a slot wall. Further rotation of the threaded rod 26 in the direction causing the nut 36 to move upwardly will move the outer tube 34 upwardly, thereby providing a lifting force on the row cleaner unit 16, which the outer tube 34 is operatively coupled to. A lifting force is desirable to decrease the downforce applied to the row cleaner unit 16 or to completely lift the row cleaner unit 16 off of the ground when no cleaning is necessary. Conversely, as the nut 36 translates downwardly along the threaded rod 26, it will eventually engage a lower end 44 of the slot wall. Further rotation of the threaded rod 26 in the direction causing the nut 36 to move downwardly will move the outer tube 34 downwardly. In some embodiments, a spring is disposed within the outer tube 34 proximate a lower end of the outer tube. In such an embodiment, the nut 36 engages the spring and begins to apply a downforce on the row cleaner unit 16. This initiates or increases a downforce on the soil that the row cleaner unit 16 is in contact with. The spring is included in some embodiments to dampen forces associated with collisions of the row cleaner unit 16 with objects on or in the soil.

Several advantages are associated with the electric row cleaner actuation assembly 20. First, the electric aspect allows the controller to more accurately track and control the position of the nut 36, which enhances the reliability and certainty of the force being applied to the row cleaner unit 16. Additionally, the assembly increases the range of force available to an operator. For example, in some embodiments, the assembly is capable of reliably providing up to 250 lbs. of force, which is much greater than the available force of pneumatic and hydraulic actuator assemblies.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An electric row cleaner actuation assembly comprising:
    a row cleaner unit engageable with a soil to clear a planting area for a seed planting device to dispense seeds;
    a motor;
    a telescoping tube arrangement comprising an inner tube and an outer tube, the outer tube moveable along the inner tube and operatively coupled to the row cleaner unit; and
    a position driving element engageable with the outer tube to displace the outer tube to adjust a downforce applied to the row cleaner unit, the position driving element comprising an actuator moveable along a rod, the actuator having at least one anti-rotation pin extending therefrom and into a slot defined by a slot wall of the outer tube, the anti-rotation pin engageable with an upper end of the slot wall to decrease the downforce and engageable with a lower end of the slot wall to increase the downforce.

2. The electric row cleaner actuation assembly of claim 1, wherein the position driving element comprises a nut moveable along a threaded rod.

3. The electric row cleaner actuation assembly of claim 1, further comprising:
    a motor controller in operative communication with the motor; and
    a downforce controller in operative communication with the motor controller.

4. The electric row cleaner actuation assembly of claim 3, wherein the downforce controller is in wired communication with the motor controller.

5. The electric row cleaner actuation assembly of claim 3, wherein the downforce controller is in wireless communication with the motor controller.

6. The electric row cleaner actuation assembly of claim 3, wherein the downforce controller is located in a cab of a tractor operatively coupled to a planter for towing of the planter, the row cleaner unit part of the planter.

7. The electric row cleaner actuation assembly of claim 3, wherein the downforce controller receives commands from a touch screen in a cab of a tractor operatively coupled to a planter for towing of the planter, the row cleaner unit part of the planter.

8. An electric row cleaner actuation assembly comprising:
    a row cleaner unit engageable with a soil to clear a planting area to dispense seeds;
    an electric motor controlled by a motor controller;
    a downforce adjustment mechanism driven by the electric motor and coupled to the row cleaner unit to adjust a downforce thereof; and a downforce controller in wireless communication with the motor controller, the downforce controller receiving commands from a user and communicating a desired downforce to be applied by the row cleaner unit, wherein the nut comprises at least one anti-rotation pin extending therefrom and into a slot defined by a slot wall of the outer tube, the nut engageable with an upper end and a lower end of the slot wall, the downforce adjustment mechanism comprising:
- a telescoping tube arrangement comprising an inner tube and an outer tube, the outer tube moveable along the inner tube and operatively coupled to the row cleaner unit; and
- a position driving element engageable with the outer tube to displace the outer tube to adjust a downforce applied to the row cleaner unit, the position driving element comprising a nut moveable along a threaded rod.

9. The electric row cleaner actuation assembly of claim 8, wherein the downforce controller is located in a cab of a tractor operatively coupled to a planter for towing of the planter.

10. The electric row cleaner actuation assembly of claim 8, wherein the downforce controller receives commands from a touch screen in a cab of a tractor operatively coupled to a planter for towing of the planter.

* * * * *